United States Patent
Kimura et al.

[11] Patent Number: 6,108,613
[45] Date of Patent: Aug. 22, 2000

[54] PROBE COORDINATE SYSTEM DRIVING APPARATUS

[75] Inventors: Tetsuo Kimura; Takashi Noda, both of Tochigi-ken, Japan

[73] Assignee: Mitutoyo Corporation, Kanagawa-ken, Japan

[21] Appl. No.: 09/150,060

[22] Filed: Sep. 9, 1998

[30] Foreign Application Priority Data

Sep. 12, 1997 [JP] Japan .................................. 9-267785

[51] Int. Cl.[7] .............................. G06F 3/33; G01B 21/20
[52] U.S. Cl. ........................... 702/150; 702/94; 702/95; 702/155; 73/862.05
[58] Field of Search .......................... 702/150, 95, 152, 702/153, 168, 155, 94; 33/503; 364/528.37; 73/862.05

[56] References Cited

U.S. PATENT DOCUMENTS

| | | |
|---|---|---|
| 4,437,151 | 3/1984 | Hurt et al. . |
| 4,604,562 | 8/1986 | Phillips et al. .......................... 318/640 |
| 4,795,952 | 1/1989 | Brandstetter . |
| 4,819,195 | 4/1989 | Bell et al. . |
| 4,945,501 | 7/1990 | Bell et al. . |
| 4,963,703 | 10/1990 | Phillips et al. ............................. 178/19 |
| 5,898,590 | 4/1999 | Wampler et al. .................. 364/474.16 |

FOREIGN PATENT DOCUMENTS 7-104153  11/1995  Japan .
8-305489  11/1996  Japan .

*Primary Examiner*—Marc S. Hoff
*Assistant Examiner*—Hien Vo
*Attorney, Agent, or Firm*—McDermott, Will & Emery

[57] ABSTRACT

A probe coordinate system driving apparatus in which, in a coordinate measuring machine, a probe can be driven in a direction in conformity with the position of the probe to thereby facilitate probe driving operation through joy stick operation. There is provided a probe head capable of freely changing the probe position through setting elevation angle $\alpha$ and angle of traverse $\beta$, and unit direction vectors representing the axes of a probe coordinate system in conformity with the probe position are obtained on the basis of the angles set. Vectors obtained from the scalar product of three electric signals output from a joy stick operating unit through the operation by the operator and the three unit direction vectors are synthesized to calculate a drive vector, and the driving of the coordinate measuring machine is controlled in accordance with this drive vector.

20 Claims, 5 Drawing Sheets

PROBE COORDINATE SYSTEM DRIVING APPARATUS

FIELD OF THE INVENTION

The present invention relates to a driving apparatus for operating a coordinate measuring machine with a joy stick and, in particular, to a probe coordinate system driving apparatus capable of moving a probe along a probe coordinate system in conformity with the orientation of the probe.

DESCRIPTION OF THE RELATED ART

A coordinate measuring machine capable of computer drive control is well known as an apparatus for measuring the coordinates, configuration, etc. of an object placed on a base. Usually, the coordinate measuring machine has X, Y and Z-drive axis mechanisms that are perpendicular to each other, and the Z-drive axis mechanism has at its forward end a spherical gauge head. Further, the machine may include a probe head that is equipped with a probe and adapted to detect contact of the gauge head with the object being measured and output a touch signal is attached thereto.

In particular, in a probe head (for example, probe head PH9 (trade name) manufactured by Renishaw Co., UK), the elevation angle α in the probe mounting section and the angle of traverse β of the lower section of the probe head can be freely varied and set through motor drive, so that the position of the probe can be arbitrarily set. For example, in the case of measurement of an object to be measured having an inclined surface, the elevation angle α and the angle of traverse β of this probe can be set such that the probe is in a position substantially perpendicular to this inclined surface before performing the measurement.

Usually, however, the directions in which the probe can be moved by operating joy sticks of a joy stick operating unit are restricted to the driving directions of the X, Y and Z-drive axis mechanisms of the coordinate measuring machine. Consequently, when the position of the probe is set to be substantially perpendicular to the inclined surface of the object, the operator experiences a sense of incongruity and finds it difficult to perform the required operation since the direction in which the probe is moved is not in conformity with the orientation of the probe.

Further, it is difficult for the operator to operate the joy stick such that the probe is smoothly translated along the inclined surface, and consequently the operation requires substantial practice. As a result, the efficiency for the measurement of an inclined surface or a hole, etc. formed therein is extremely poor as compared with that for the measurement of a flat portion. Furthermore, there is a concern that the operator will inadvertently cause the probe to collide with the object and thereby break the expensive probe head or probe. To avoid such a collision, it is necessary to operate the joy stick such that the probe is moved slowly.

Japanese Patent Application No. 60-210746 an invention made in view of the above problems. In the above-mentioned invention, however, it is necessary to measure the inclined surface in order to construct in the computer a work coordinate system in conformity with the inclined surface. Using this process, the directions in which the probe can be moved through joy stick operation are still restricted to the driving directions of the X, Y and Z-drive axis mechanisms. Thus, the measurement for constructing the work coordinate system requires a joy stick operation which is equally as difficult as other systems and requires substantial practice. Thus, the process described in the Japanese Patent Application No. 60-210746 fails to simplify the process of operating the probe.

In another invention, described in Japanese Patent Application No. 7-132770, the probe driving direction is assigned to each joy stick according to a unit direction vector. In this invention, it is also necessary to perform measurement in advance to obtain the vector and to set the unit direction vector.

SUMMARY OF THE INVENTION

The present invention has been made with a view toward solving the above problems. It is an object of the present invention to facilitate the driving of the probe using joy stick operation in a coordinate measuring machine.

To achieve the above object, the present invention provides a probe coordinate system driving apparatus. The driving apparatus includes a coordinate measuring machine equipped with a plurality of drive shaft mechanisms capable of being driven by a motor and orthogonal with respect to each other. The driving apparatus further includes a probe mounted to one of the drive shaft mechanisms of the coordinate measuring machine and adapted to detect contact with an object to be measured, and a probe head adapted to hold the probe and capable of freely varying the position of the probe. The driving apparatus also includes a joy stick operating means equipped with one or more joy sticks to operate the coordinate measuring machine and adapted to output three electric signals in correspondence with the operation of the joy sticks, a CPU equipped with a step for calculating three unit direction vectors indicating the X, Y and Z-axis directions of the probe coordinate system in conformity with the position of the probe, a drive vector sum-of-product calculating circuit for calculating a drive vector by synthesizing vectors obtained by obtaining scalar products of the three electric signals output from the joy stick operating means and the three unit direction vectors, and a motor driving circuit for driving a motor with which each drive axis mechanism of the coordinate measuring machine is equipped in accordance with this drive vector.

In addition to the above, the probe coordinate system driving apparatus of the present invention may further include an AD converter for converting an electric signal output from the joy stick operating means to a digital signal, and a DA converter for converting the drive vector calculated by the drive vector sum-of-product calculating circuit to an analog signal.

In addition, the probe head of the present invention may be equipped with a rotary probe head capable of freely setting elevation angle and angle of traverse.

By matching the direction in which the probe is moved using joy stick lever operation with the position of the probe, it is possible to facilitate the measurement of an object having an inclined surface.

DESCRIPTION OF THE PREFERRED EMBODIMENT

Figure 1:
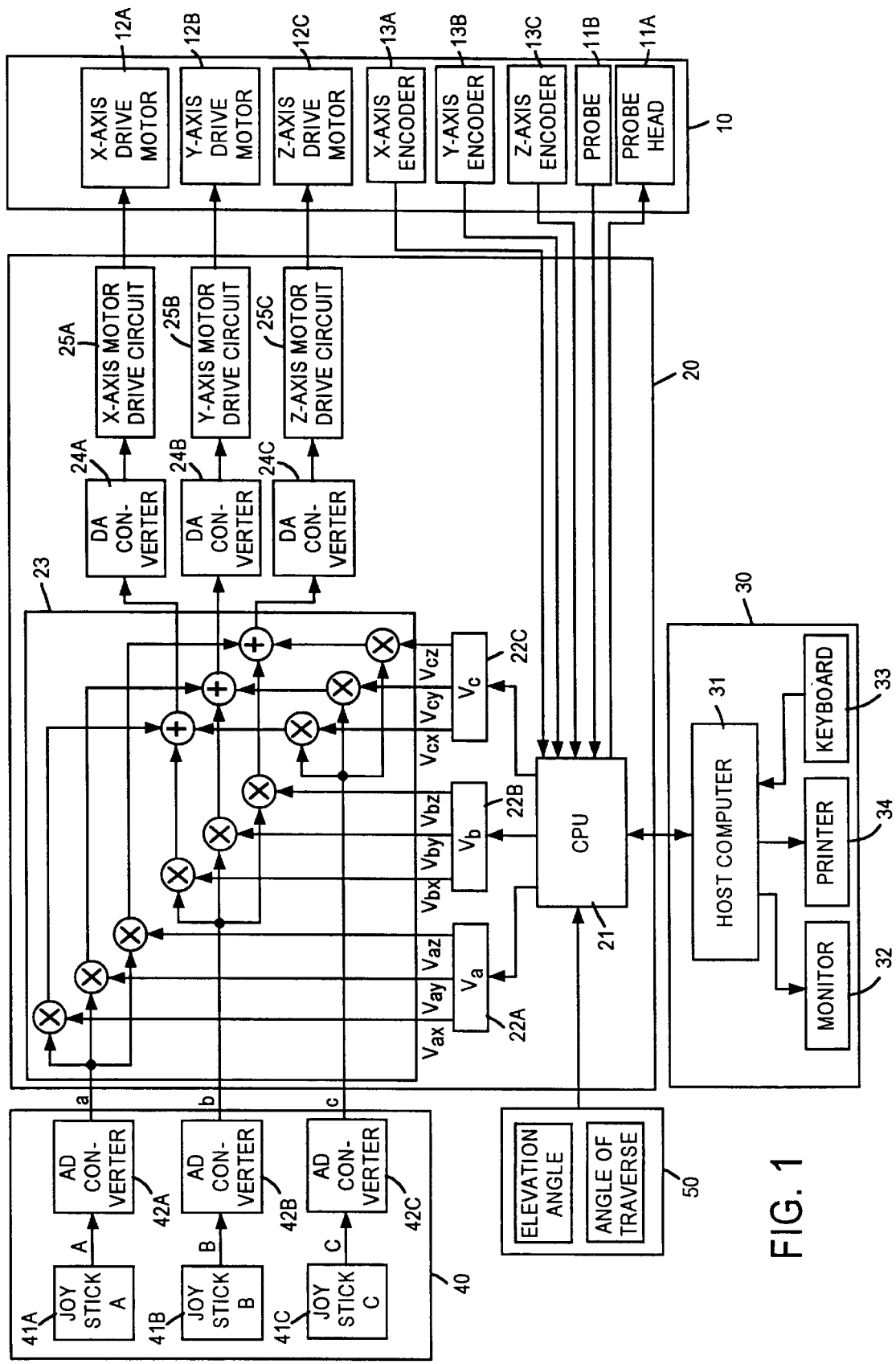
FIG. 1 is a block diagram illustrating the present invention.

A preferred embodiment of the present invention will now be described with reference to the drawings. In the drawings, the same components are indicated by the same reference numerals.

FIG. 1 is a block diagram illustrating a preferred embodiment of the present invention. When the operator tilts levers 43 and 44 connected to joy sticks 41A, 41B and 41C of the joy stick operating unit 40 shown in FIG. 4, electrical signals A, B and C substantially in proportion to the tilt angles are output. The tilting of the lever 43 in the lateral directions is detected by the joy stick 41A, and electric signal A is output. The tilting of the lever 43 in the longitudinal directions is detected by the joy stick 41B, and electric signal B is output. Similarly, the tilting of the lever 44 in the longitudinal directions is detected by the joy stick 41C, and electric signal C is output.

Next, these signals A, B and C are input to AD converters 42A, 42B and 42C and converted to digital signals a, b and c before being input to a drive control device 20. In the drive control device 20, unit direction vectors Va, Vb and Vc indicating the probe drive directions when the joy sticks are operated are set in advance in memories 22A, 22B and 22C. Usually, the initial condition of these unit direction vectors Va, Vb and Vc is set in conformity with the drive directions of the X, Y and Z-drive shaft mechanisms of the coordinate measuring machine. The initial condition is set as follows:

Va=(1, 0, 0), Vb=(0, 1, 0), and Vc=(0, 0, 1) Thus, usually, when joy stick operation is performed in this condition, the probe is moved in parallel with respect to each drive shaft mechanism.

Next, the output signals a, b and c from the joy stick operating unit 40 are supplied to a sum-of-product calculating circuit 23, where the scalar products of the unit direction vectors Va, Vb and Vc are calculated. Further, the vectors are added together to calculate the drive vectors of the drive shafts. The drive vectors thus obtained are then input to the DA converters 24A through 24C to be converted to analog signals, and then input to shaft motor drive circuits 25A through 25C. Next, an electric current output from these shaft motor drive circuits 25A through 25C is input to each shaft drive motor 12A through 12C of the coordinate measuring machine 10 to drive the coordinate measuring machine.

The present coordinate data of each shaft of the coordinate measuring machine 10, that is, the reading values of the encoders 13A through 13C of the shafts are constantly input to the CPU 21, whereby accurate control of measurement and probe drive positioning is made possible.

Figure 2:
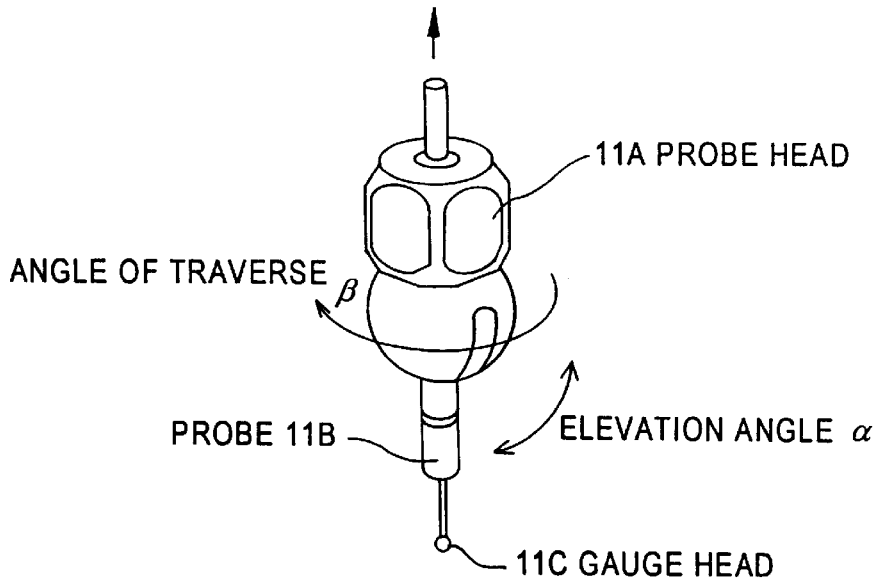
FIG. 2 depicts a probe head according to the present invention.

Further, the forward end of the Z-drive shaft of the coordinate measuring machine 10 is equipped with a probe head 11A as shown in FIG. 2 and, further, a probe 11B at the forward end of the probe head 11A. To come into contact with the object of measurement, this probe 11B is equipped with a spherical gauge head 11C made of a hard material, such as ruby. When this gauge head 11 comes into contact with the object of measurement, the detection mechanism in the probe 11B detects the contact and outputs a touch signal. As shown in FIG. 1, the touch signal is input to the CPU 21. Upon receiving the touch signal, the CPU 21 secures the reading values of the encoders 13A through 13C of the shaft at that moment as measurement data and stores it in memory (not shown) as needed.

Next, the probe head 11A will be described in detail with reference to FIG. 2. The upper section of the probe head 11A (which consists, for example, of the probe head PH9 (trade name) manufactured by Renishaw, Co., UK) is equipped with a pin. Usually, the pin is inserted into the lowermost section of the Z-shaft drive mechanism of the coordinate measuring machine 10 and fastened by a screw so that even when the coordinate measuring machine 10 is driven it is firmly connected and secured so as to involve no play. In performing this mounting, it is necessary to determine in advance the orientation of the coordinate measuring machine and the orientation of the probe head 11A. Usually, the orientation when the angle of traverse $\beta=0$ is matched with the negative direction of the Y-axis driving mechanism of the coordinate measuring machine or matched with the positive direction of the X-axis driving mechanism. It is also possible to provide a positioning pin on the upper surface of the probe head 11A and a pin receiving jig at the lower end of the Z-axis drive mechanism of the coordinate measuring machine.

The lower portion of the probe head 11A can rotate with respect to the upper portion at intervals of 7.5 degrees within the range of $\pm 180$ degrees through motor drive, that is, the angle of traverse $\beta$ can be freely set. Similarly, the portion where the probe 11B is mounted is capable of rotating at intervals of 7.5 degrees in the range of from 0 to 150 degrees through motor drive, that is, the elevation angle $\alpha$ can be freely set. The values of the angle of traverse $\beta$ and the elevation angle $\alpha$ designated by the operator through the probe head position operating unit 50 are input to the probe head 11A through the drive control device 20, and each of them is rotated by the angle designated through motor drive to change the position, whereby the position of the probe 11B can be freely set to a desired direction. In many cases, in actual measuring operation, not only the upper surface of the object of measurement but also a vertical side surface or an inclined surface thereof is measured. It is said that, ideally, by changing the position of the probe B each time so as to be perpendicular to the object of measurement, and bringing the probe 11B gradually close to the object from the direction in conformity with this position, that is, the direction perpendicular to the measurement surface, the gauge head 11C does not slide on the surface of the object of measurement at the time of coming into contact, so that the deterioration in accuracy is at a minimum.

Figure 4:
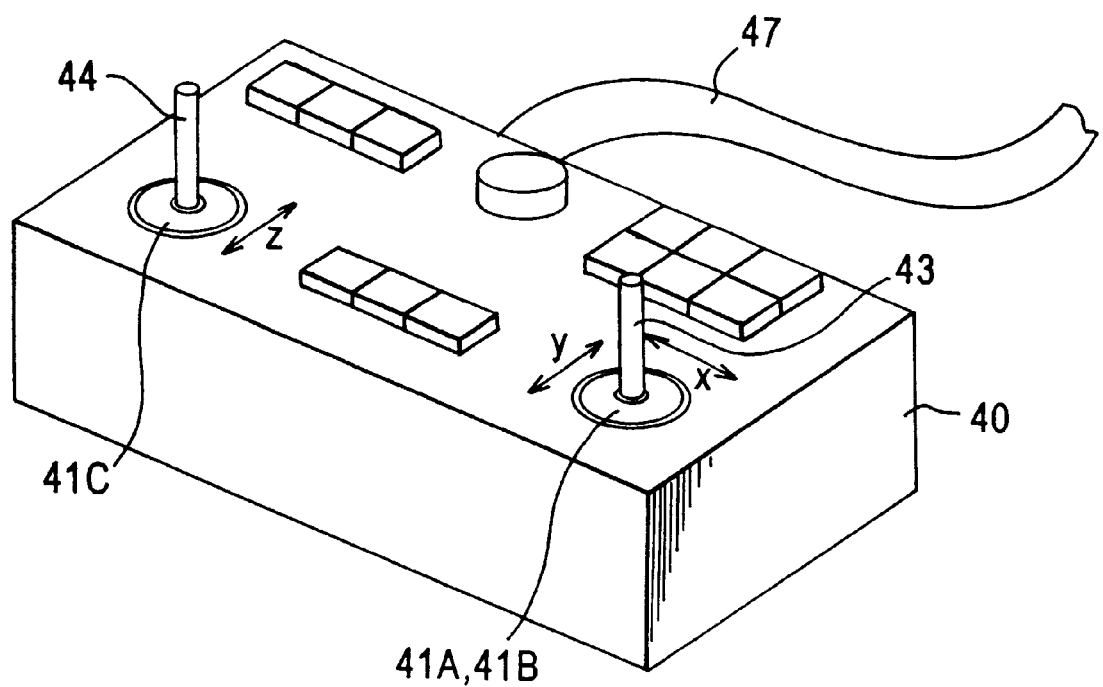
FIG. 4 depicts a joy stick operating unit according to the present invention.
Figure 5:
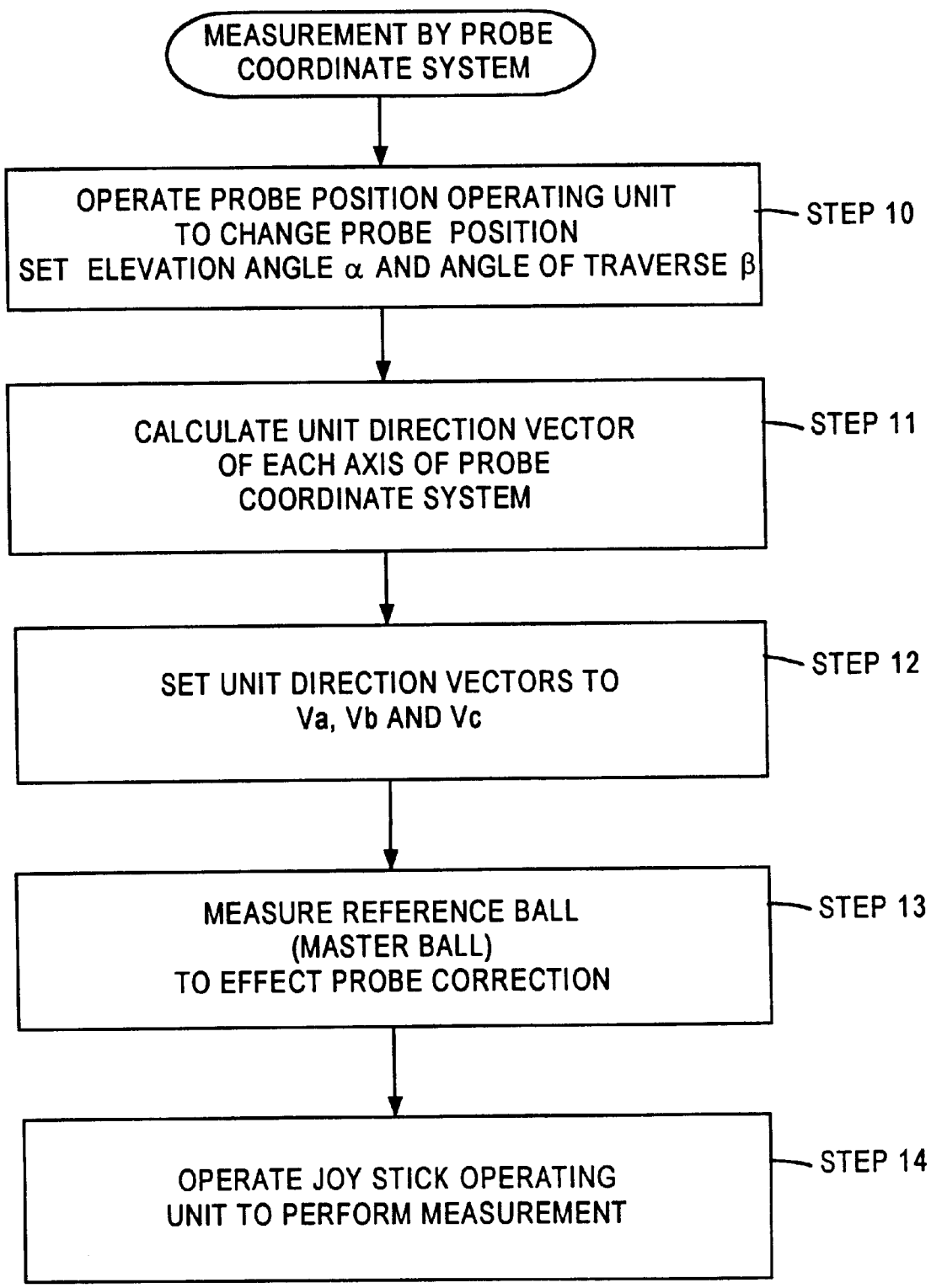
FIG. 5 is a flowchart illustrating measurement procedures according to the present invention.
Figure 6:
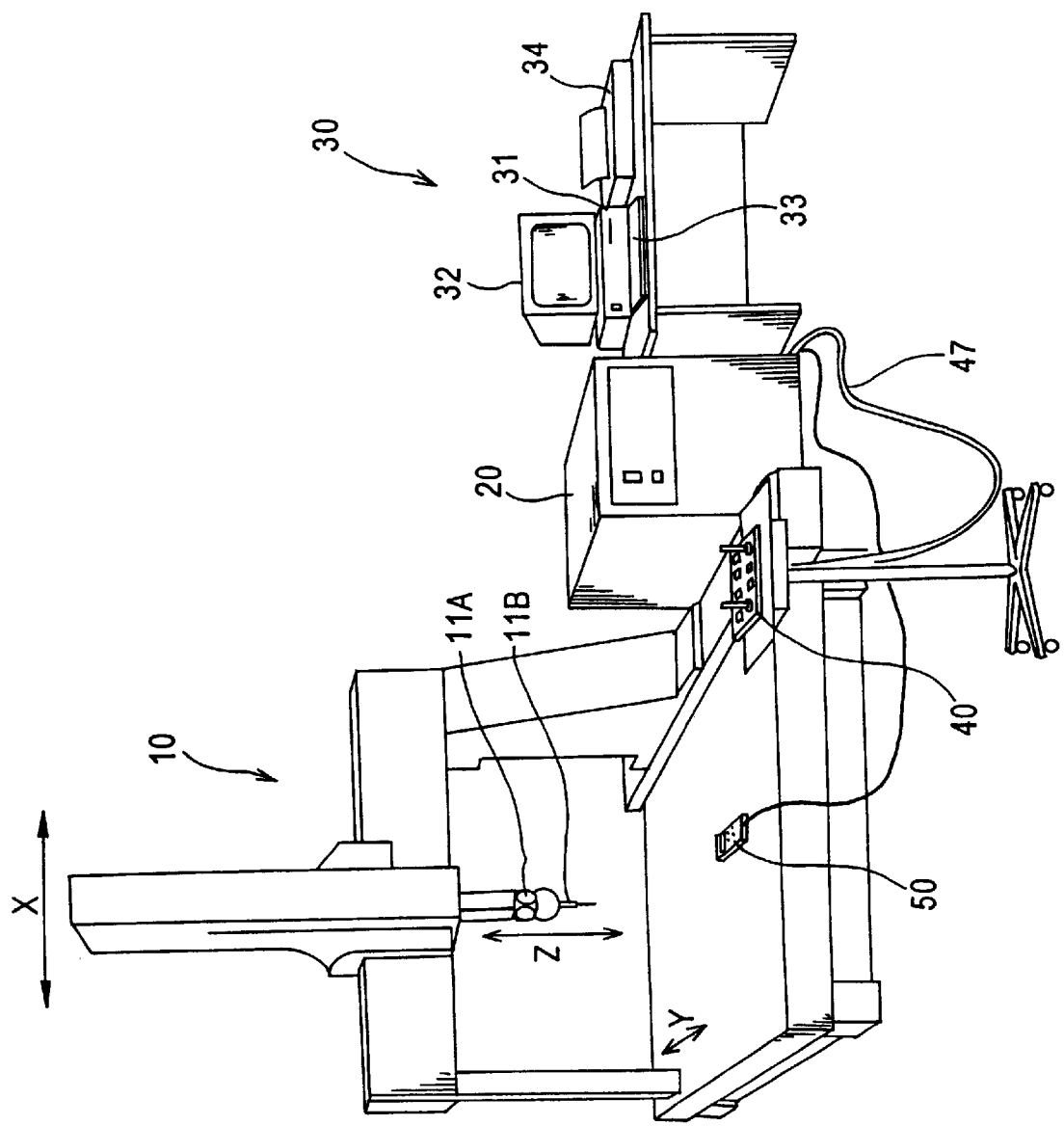
FIG. 6 depicts a coordinate measuring machine according to the present invention.

Usually, after changing the position as described above, the following probe correcting operation is performed. The joy sticks 41A through 41C shown in FIG. 4 are operated to drive the coordinate measuring machine 10 to cause the gauge head 11C to come into contact with at least four sections of a reference ball (master ball) (not shown) which is placed on the base plate of the coordinate measuring machine 10 and whose diameter value is accurately known in advance. When, through this contact, a touch signal is input to the CPU 21 from the probe 11B, the reading values of the shaft encoders at that moment are secured and stored as measurement coordinate values in predetermined memory areas. Next, a geometrical calculation method such as the least square method is applied to the measurement coordinate values measured at four sections or more to calculate a spherical configuration, and, by calculating backwards from the obtained center coordinate values (the vector from the center of the above-mentioned reference ball to the center of the gauge head 11) and the diameter value, the diameter value and the coordinate values of the gauge head 11C are obtained.

Next, measurement procedures using a probe coordinate system in the measurement of an object having an inclined surface will be described in detail with reference to FIGS. 3 and 5. First, in step 10, the probe head position operating unit 50 is operated such that the probe 11B becomes substantially perpendicular to the inclined surface of the object of measurement. At this time, there is no need for the position of the probe 11B to be strictly perpendicular to the inclined surface; the elevation angle a and the angle of traverse β are set visually. For example, in the case of FIG. 3, the setting is made such that the elevation angle α=45 degrees and the angle of traverse β=0 degrees. At this time, even if the position of the probe is somewhat deviated from the direction perpendicular to the inclined surface, no great problem is involved in actual measurement, and measurement can be performed without a hitch.

When the values of the elevation angle α and the angle of traverse β are input and designated from the probe head operating unit 50 to the CPU 21, an angle change command is immediately output to the probe head 11A, and motors provided in the probe head 11A for rotation of the elevation angle and the angle of traverse are driven, and the angles are changed and set. Further, the values of the elevation angle α and the angle of traverse β are stored in a predetermined memory inside the CPU 21. These values are used afterwards when calculating the unit vector in each axis direction of the probe coordinate system.

Further, in measurement operation, if the elevation angle α and the angle of traverse β once set are such that there is a concern that any other portion than the gauge head 11C, for example the stylus, will interfere with the object of measurement during the movement of the probe 11B, fine angle adjustment is performed again by using the probe head position operating unit 50. However, in the probe head 11A, angle setting can only be effected at intervals of 7.5 degrees, so that it is difficult to effect setting such that the probe is strictly perpendicular to the inclined surface. However, when, apart from the probe head 11A, a probe head is used in which angle setting is effected on a non-stage basis, is possible to effect setting such that the probe is strictly perpendicular to the inclined surface. In this case, the elevation angle α and the angle of traverse β of the probe head are set to zero, and measurement is performed at three or more points on the inclined surface to obtain the normal direction of the inclined surface, and setting is effected such that the position of the probe 11B is in conformity with this normal direction. By matching the axis passing through the center of the probe 11B with the normal direction of the inclined surface, it is possible to set the probe 11B and the probe coordinate system 60 such that the probe is strictly perpendicular to the inclined surface, so that a measurement relatively free from deterioration in accuracy can be expected.

Further, when the angle of the inclined surface is known in advance through design values or the like, it is possible to set the elevation angle α and the angle of traverse β on the basis of these values, making it possible to make the probe position more correctly perpendicular to the inclined surface than in the case of visual measurement.

Figure 3:
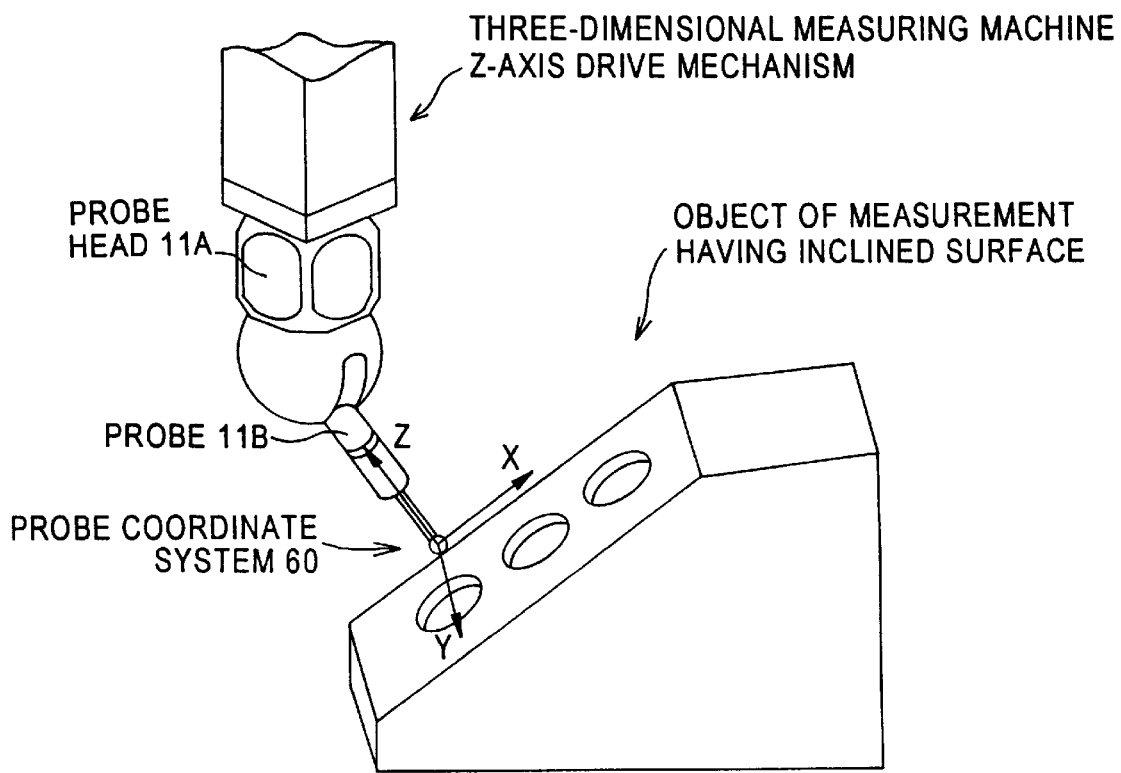
FIG. 3 illustrates a measurement operation according to the present invention.

Next, in step 11, the unit direction vector of each coordinate axis of the probe coordinate system shown in FIG. 3 is obtained through calculation on the basis of the elevation angle α and the angle of traverse β set in advance and stored in the predetermined memory inside the CPU 21. The method of calculation is a quite general coordinate transformation (rotation) matrix computation.

Next, the values of the vectors obtained in step 12 are stored in memories 22A, 22B and 22C to set the values of the vectors Va, Vb and Vc. Thus, through the operation of the joysticks 41A, 41B and 41B from this point on in the process, it is possible to move the probe 11B along the direction of the probe coordinate system shown in FIG. 3.

By tilting the lever 43 to the right or left, it is possible to move the probe 11B in the X-axis direction of the probe coordinate system 60. Similarly, when the lever 43 is tilted in the longitudinal direction, the probe 11B can be moved in the Y-axis direction of the probe coordinate system 60. Similarly, when the lever 44 is tilted in the longitudinal direction, it is possible to move the probe 11B in the Z-axis direction of the probe coordinate system.

Next, in step 13, the reference ball (master ball) (not shown) is measured to perform probe correction. Depending on the configuration of the object of measurement, it is necessary to replace the probe position, the gauge head, etc. when all the predetermined section cannot be measured in the same position and using the same gauge head. At this time, it is necessary to correct the positional relationship between the reference ball and the gauge head. Although the diameter value of the gauge head 11C ought not to be changed if the position of the probe 11B is changed, the apparent diameter value can change according to the position, so that it is necessary to perform probe correcting operation for each set angle. The correction data once obtained can be recorded in a file or the like and stored in the host computer 31, so that, when the same elevation angle α and the angle of traverse β are set next time, it is possible to call up the correction data from the recorded file and use it. In this case, the correcting operation can be omitted, so that the operational efficiency can be improved.

Next, in step 14, the levers 43 and 44 of the joy stick operating unit 40 are operated to measure the object. For example, when a hole in an inclined surface is measured as in the case of FIG. 3, it is possible to move the probe 11B obliquely along the inclined surface by tilting the lever 43 to the right or left. Conventionally, when thus moving the probe obliquely, it is necessary to simultaneously operate two joy sticks, so that the operation is complicated and requires practice. Further, when inserting the probe 11B substantially perpendicularly in this hole, it is only necessary to tilt the lever 44 longitudinally, so that prevention of collision of the probe with the object of measurement, which was conventionally often generated as a result of erroneous operation of the joy sticks, can be expected.

Further, since the probe 11B can be moved substantially perpendicularly to the inclined surface of the object of measurement and in a direction in conformity with the position of the probe 11B, the operator experiences no feeling of incongruity. Further, it is possible to perform a measurement relatively free from a deterioration in measurement accuracy. Further, the coordinate values of measurement data expressed in the mechanical coordinate system or the work coordinate system are naturally free from the influence of the probe coordinate system drive.

While the preferred embodiment of the present invention has been described, this invention is not restricted to this embodiment. Modifications are possible without departing from the spirit and the scope of the invention.

For example, while the above embodiment has been described with reference to joy stick drive operation based on a probe coordinate system, the present invention is also applicable to a mechanical coordinate system (a coordinate system parallel to each driving shaft mechanism of the coordinate measuring machine main body) and a work coordinate system (a coordinate system set so as to extend along an end surface, etc. of the object of measurement on the basis of the object of measurement). In this case also, the present invention can be easily carried out solely by setting the unit direction vectors of the axes of the coordinate system to memories 22A through 22C in the drive control device 20, that is, the values of vectors Va, Vb and Vc. Further, while in the above embodiment the unit direction vectors of the coordinate axes of the probe coordinate system are obtained through calculation each time the set angle is changed on the basis of the elevation angle α and the angle of traverse β set by the operator, the number of possible angles for the probe head is not infinite. There are 15 possible elevation angles α at intervals of 7.5 degrees in the range of from 0 to 105 degrees, and 49 possible elevation angles α at intervals of 7.5 degrees in the range of from −180 to +180 degrees. Thus, there are 735 possible combinations of angles. Thus, it is also possible to obtain in advance through calculation the unit direction vectors of the coordinate axes of the probe coordinate system when the combination of the respective angles is set, and store them in the drive control device 20, reading the unit direction vectors of the coordinate axes corresponding to this angle combination upon changing and setting of the elevation angle α and the angle of traverse β by the operator to set them to unit direction memories 22A, 22B and 22C. In this case, there is no need to perform calculation each time the set angle is changed, so that it is possible to effect a smooth operation without placing extra computation load on the CPU 21.

In accordance with the present invention, in measuring an object having an inclined surface, it is possible to facilitate the joy stick operation for moving the probe obliquely along the inclined surface. Further, since, even in the case of an object having an inclined surface, it is possible to visually set the probe to a substantially perpendicular position with respect to the place where the measurement is performed, it is possible, during measurement, to bring the probe close to the object from a direction substantially perpendicular to the place of measurement and cause it to come into contact therewith. Thus, as compared with the case in which measurement is performed by obliquely bringing the probe close to the object, the generation of measurement errors can be restrained. Further, since the probe can be easily moved in a direction in conformity with the probe position, the operator can operate without experiencing a sense of incongruity, and the errors in measurement operation can be reduced.

What is claimed is:

1. A probe coordinate system driving apparatus comprising:
    a plurality of drive mechanisms oriented orthogonally with respect to one another;
    a probe mechanism mounted to one of said drive mechanisms, said probe mechanism including a probe having an orientation, said probe mechanism being configured to freely vary the orientation of said probe;
    at least one input device adapted to generate three electric signals corresponding to operation of said at least one input device;
    means for calculating three unit direction vectors based upon the orientation of said probe;
    means for calculating a drive vector based upon the three signals and the three unit direction vectors; and
    means for driving said plurality of drive mechanisms in accordance with the drive vector.

2. The probe coordinate system driving apparatus according to claim 1, wherein said probe mechanism includes a probe head mounted to one of said drive mechanisms, said probe head being adapted to freely vary the orientation of said probe, and said probe being mounted to said probe head.

3. The probe coordinate system driving apparatus according to claim 1, wherein the probe mechanism includes a rotary probe head adapted to freely set elevation angle and angle of traverse of said probe.

4. The probe coordinate system driving apparatus according to claim 1, wherein:
    said probe is adapted to detect contact with an object and generate a corresponding touch signal; and
    said means for calculating three unit direction vectors receives data representing the orientation of said probe based upon triggering of the touch signal.

5. The probe coordinate system driving apparatus according to claim 1, wherein the three unit direction vectors represent X, Y, and Z axis directions of a probe coordinate system.

6. The probe coordinate system driving apparatus according to claim 1, wherein said means for calculating a drive vector calculates the drive vector by synthesizing scalar products of the three signals and the three unit direction vectors.

7. The probe coordinate system driving apparatus according to claim 1, wherein said at least one input device includes a plurality of joysticks.

8. The probe coordinate system driving apparatus according to claim 1, further comprising:
    an AD converter for converting an electrical signal output from said at least one input device to a digital signal; and
    a DA converter for converting the drive vector to an analog signal.

9. The probe coordinate system driving apparatus according to claim 1, wherein:
    said plurality of drive mechanisms each include a motor adapted to translate said probe mechanism along a corresponding axis in accordance with the drive vector.

10. The probe coordinate system driving apparatus according to claim 9, wherein:
    said plurality of drive mechanisms each include a circuit adapted to drive said motor in accordance with the drive vector.

11. The probe coordinate system driving apparatus according to claim 1, wherein said probe includes a predetermined initial orientation.

12. A probe coordinate system driving apparatus comprising:
    a coordinate measuring machine equipped with a plurality of drive mechanisms adapted to be driven by a motor and orthogonal with respect to each other;
    a probe mounted to one of said drive shaft mechanisms to detect contact with an object to be measured;
    a probe head configured to hold said probe and being capable of freely varying a position of said probe;
    an operating device equipped with at least one joystick to operate said coordinate measuring machine and configured to output three electric signals in correspondence with operation of said joystick;
    means for calculating three unit direction vectors indicating X, Y and Z-axis directions of said probe coordinate system in conformity with a position of said probe;
    means for calculating a drive vector by synthesizing vectors obtained by obtaining scalar products of the three electric signals output from said joystick operating device and the three unit direction vectors; and
    a circuit adapted to drive a motor with which each drive axis mechanism of said coordinate measuring machine is equipped in accordance with the drive vector.

13. A probe coordinate system driving apparatus according to claim 12, further comprising:
- an AD converter for converting an electrical signal output from said joystick operating device to a digital signal; and
- a DA converter for converting the drive vector calculated by said means for calculating a drive vector to an analog signal.

14. A probe coordinate system driving apparatus according to claim 12, wherein said probe head comprises a rotary probe head capable of freely setting elevation angle and angle of traverse.

15. The probe coordinate system driving apparatus according to claim 12, wherein:
- said probe is adapted to generate a touch signal corresponding to detection of contact between said probe and the object; and
- said means for calculating three unit direction vectors receives data representing the orientation of said probe based upon triggering of the touch signal.

16. The probe coordinate system driving apparatus according to claim 12, wherein said operating device includes a plurality of joysticks.

17. The probe coordinate system driving apparatus according to claim 12, wherein said probe includes a predetermined initial orientation.

18. A method for measuring an object using a probe coordinate system driving apparatus including a plurality of drive mechanisms oriented orthogonally with respect to one another, a probe mechanism mounted to one of the drive mechanisms, the probe mechanism including a probe having an orientation, the probe mechanism being configured to freely vary the orientation of the probe, and at least one input device, said method comprising the steps of:
- generating three electric signals corresponding to operation of the at least one input device;
- calculating three unit direction vectors based upon orientation of the probe;
- calculating a drive vector based upon the three signals and the three unit direction vectors; and
- driving the plurality of drive mechanisms in accordance with the drive vector.

19. The method for measuring an object according to claim 18, wherein the step of calculating a drive vector includes calculating the drive vector by synthesizing scalar products of the three signals and the three unit direction vectors.

20. The method for measuring an object according to claim 18, wherein the step of calculating three unit direction vectors includes receiving data representing the orientation of said probe based upon triggering of a touch signal generated upon contact of the probe with the object.

* * * * *